United States Patent [19]
Hurlstone

[11] Patent Number: 4,899,486
[45] Date of Patent: Feb. 13, 1990

[54] TREE SHELTERS

[76] Inventor: Graham F. Hurlstone, Willow Cottage, Farnham Lane, Haslemere, Surrey GU27 1EY, United Kingdom

[21] Appl. No.: 72,259
[22] PCT Filed: Oct. 2, 1986
[86] PCT No.: PCT/GB86/00593
§ 371 Date: Jun. 2, 1987
§ 102(e) Date: Jun. 2, 1987
[87] PCT Pub. No.: WO87/01904
PCT Pub. Date: Apr. 9, 1987

[30] Foreign Application Priority Data
Oct. 4, 1985 [GB] United Kingdom ............... 8524506

[51] Int. Cl.⁴ .............................................. A01G 13/02
[52] U.S. Cl. .......................................... 47/30; 47/23; 47/42
[58] Field of Search ............... 47/30, 23, 25, 26, 32, 47/43, 42, 44, 45, 40.5; 248/528, 529, 519, 516

[56] References Cited
U.S. PATENT DOCUMENTS

| 361,241 | 4/1887 | Rugg | 47/30 X |
|---|---|---|---|
| 645,518 | 3/1900 | Watt | 47/30 |
| 770,461 | 9/1904 | Haggerty | 47/23 |
| 1,485,924 | 3/1924 | Hobbs | 47/31 |
| 3,384,992 | 5/1968 | Heffron | 47/29 |
| 3,816,959 | 6/1974 | Nalle, Jr. | 47/23 |
| 4,596,106 | 6/1986 | Kunczynski | 47/23 X |
| 4,699,347 | 10/1937 | Kuhnley | 47/40.5 |
| 4,711,051 | 12/1987 | Fujimoto | 47/30 X |

FOREIGN PATENT DOCUMENTS

| 0133019 | 2/1985 | European Pat. Off. | |
|---|---|---|---|
| 2536247 | 5/1984 | France | 47/44 |
| 149102 | 8/1920 | United Kingdom | 47/30 |
| 2160582 | 6/1926 | United Kingdom | 47/23 |
| 613721 | 12/1948 | United Kingdom | |
| 769696 | 3/1957 | United Kingdom | |
| 2148684 | 6/1985 | United Kingdom | 47/30 |

Primary Examiner—Mickey Yu
Assistant Examiner—Kevin G. Rooney
Attorney, Agent, or Firm—Berman, Aisenberg & Platt

[57] ABSTRACT

A tree shelter 10 comprises a twin-walled tubular extrusion of UV-degradable polypropylene formed with an out-turned lip or flange 28 at its upper end and a longitudinal V-section channel receiving a stake 26 which is securable therein by two ratchet-locking cable ties 32.

7 Claims, 3 Drawing Sheets

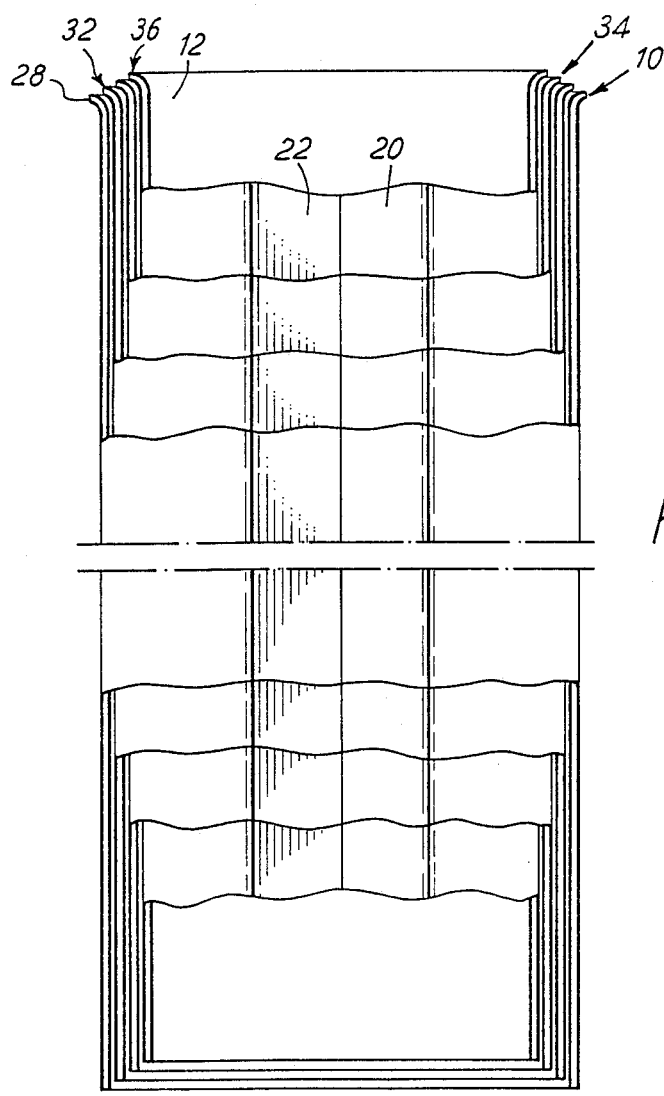

TREE SHELTERS

This invention relates to tree shelters.

A tree shelter is a usually tubular, but sometimes conical, structure formed of translucent plastics material that is disposed around a newly-planted tree and secured to a skate extending inside or outside the structure. Since their introduction in 1979 tree shelters have proved their value in promoting the growth of a young tree by establishing a favourably micro-climate; supporting the tree; protecting the tree from wind or animal damage; and enabling the intervening ground to be treated chemically to deter the growth of competing vegatation. Currently available pre-formed tubular tree shelters may be of one of the following types:

(1) A tube of square or hexagonal cross-section formed by folding corrugated polypropylene sheet and joining the longitudinal edges with a lap seam secured by welding or stapling.

(2) A rigid cylinder of extruded polypropylene.

(3) A flexible tube of circular cross-section having circumferential ridges which is extruded from polypropylene and resembles a land drainage pipe.

All the above types of tree shelter are normally secured to the stake, whether this is located internally or externally, by wire ties. These have the disadvantages of being difficult and time-consuming to apply, particularly when they have to be threaded round an internal stake; of allowing pivotal movement of a shelter secured to an external stake; of being liable to become embedded in the trunk of a growing tree; and of being a danger to animals on the eventual disintegration of the shelter.

According to a first aspect of the present invention these disadvantages are overcome by a tree shelter comprising a hollow, elongate, open-ended body, formed of translucent or transparent plastics material and having a longitudinally-extending external channel or a socket no additional fastening is required and in the case where the stake is located in a channel two simple straps or ties are adequate to secure the shelter. In place of the normal horticultural or arboricultural type, it is preferred to use, according to the present invention, a non-releasable cable tie.

Preferably the body is a tube and is formed by extrusion of a plastics material such as a polypropylene, polystyrene or polycarbonate. In a preferred construction the tube generally has twin walls connected by radially disposed webs, while the walls of the socket or channel are solid.

Young trees are very susceptible to chafe damage from the upper edge of the shelter and according to a further aspect of the present invention there is provided a tree shelter formed at one end with a lip or flange extending outwardly beyond the outer surface of the body. Advantageously such a shelter is also in accordance with the first aspect of the invention.

A shelter according to the present invention may be provided with upper and lower circumferential indentations for reception of a strap or tie.

Moreover, the shelter according to the present invention is preferably camouflaged by painting the external surface of the tube in green and brown by means of silk screen printing.

One of the advantages of the aforementioned lay-flat square or hexagonal cross-section shelter over a rigid extruded shelter of circular cross-section is that the sleeve may be packed and transported in flat condition thus enabling a very favourable packing ratio of eight folded tubes to one open tube to be achieved. The achievement of a favourable packing ratio is particularly important where the shelters are to be established at a remote or inaccessible site, besides reducing normal packing and transport costs.

According to the present invention the aforementioned disadvantage of rigid shelters is greatly alleviated by the provision of a set of shelters, each comprising a hollow body preferably formed with a channel for reception of a stake, and having different cross-sectional dimensions so chosen that the set may be nested.

Preferably, such an assembly of nesting shelters has four members, the smallest one of which has a diameter of the optimum minimum diameter of 8 cm, thus achieving a very acceptable packing ration of 4:1.

The nesting shelters preferably exhibit the previously mentioned preferred features.

Although the invention may be carried out in a variety of ways, two embodiments thereof will now be described, by way of example, with reference to the accompanying drawings in which FIG. 1 is an elevation of a tree shelter according to the invention before installation showing the stake-receiving recess;

FIG. 5 is a vertical section through the shelter of FIG. 1, as one of a nesting set of shelters.

Figure 1:
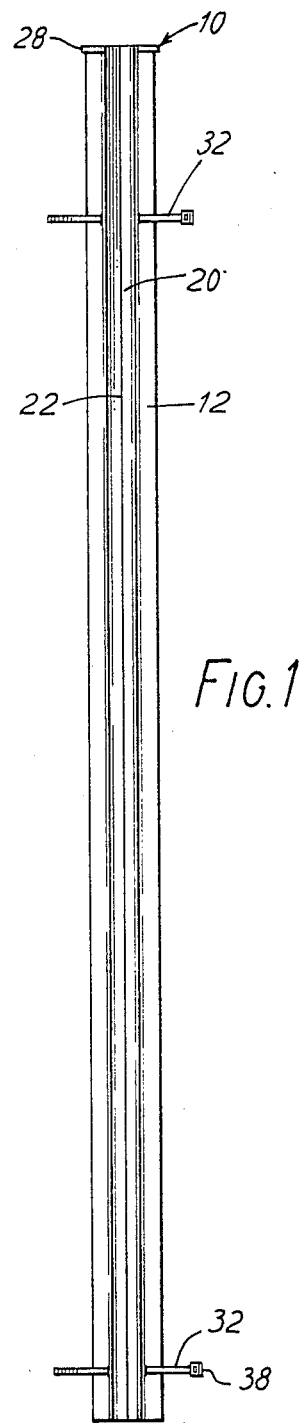
Figure 3:
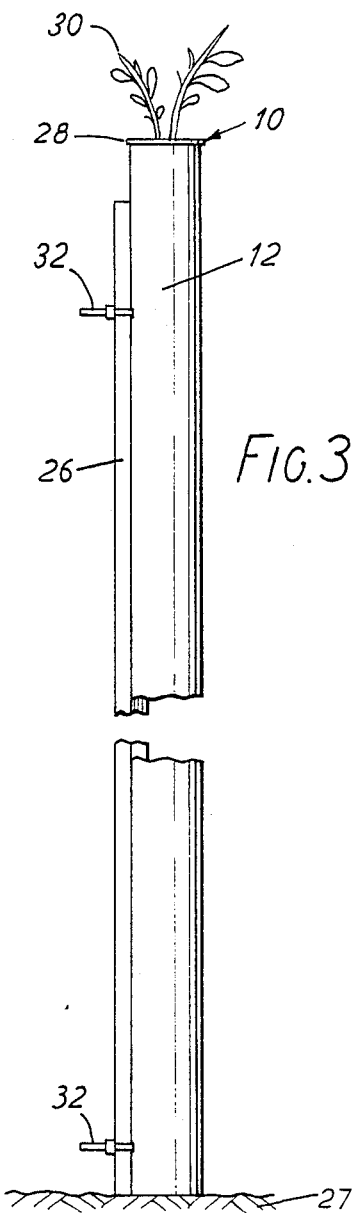
FIG. 3 is another elevation of the tree shelter, taken from the side as seen in FIG. 1, installed around a young tree.
Figure 2:
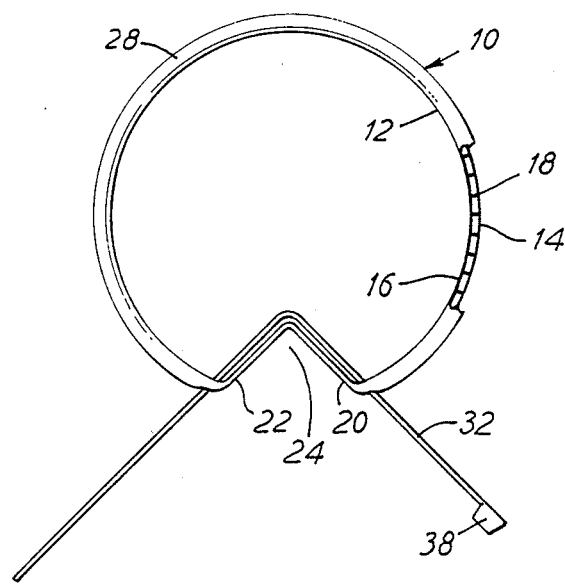
FIG. 2 is a plan of the shelter of FIG. 1.
Figure 4:
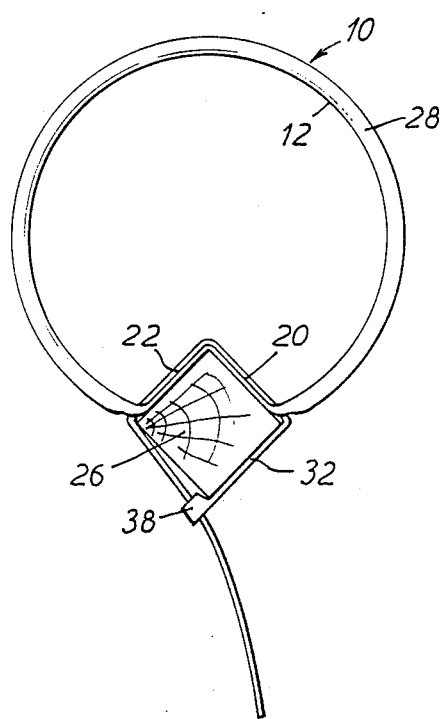
FIG. 4 is a plan, partly broken away and corresponding to FIG. 3 of the installed shelter with the tree omitted.

As shown in FIGS. 1 to 4 a tree shelter 10 comprises a polypropylene extrusion cut to a required length, for example 1.2 m, and having around its arcuate portion 12 twin walls 14,16 (see FIG. 2) joined by regularly spaced webs 18, thus giving a very robust but lightweight structure. Two solid, plane mutually-perpendicular walls 20,22 define a V-section channel 24 for reception of a stake 26 driven into the ground 27. At one end the shelter 10 is formed with a lip 28 around its arcuate portion 12 so as to minimise damage to the shoots, bark, stem or branches of a young tree 30 growing therein. (It will be noted that the lip 28 extends beyond the external diameter of the arcuate portion 12). The shelter 10 is secured to the stake 26 by two ratchet-locking plastics cable ties 32 of the type sold under the Trade Mark of, for example, Insulox or Fastex, the ties passing through apertures in the portion 12 and behind the channel 24.

The shelter 10 may be opal, green or brown in colour and provides the facility of being camouflaged, for example to give a twig and leaf effect, by silk screen printing.

As shown in FIG. 5 the shelter 10 forms one of a set of four shelters 10, 32, 34, 36 having cross-sectional dimensions chosen so that the shelter 32 will just fit within the shelter 10 and so on, to make a nesting set of four shelters, the lip 28 on each shelter serving to prevent it from being inserted too far into the receiving shelter. The smallest shelter 36 has an internal diameter of the recommended minimum of 8.0 cm, and the shelters 34, 32,10 successively greater diameters. Because the four shelters 10,32,34,36 take up virtually only the volume of the single shelter 10, packing and transport costs are greatly reduced, and use on difficult sites facilitated.

To install the shelter 10 the square-section stake 26 is driven into the ground 27 near the newly-planted tree 30 and the shelter 10 slid over the tree 30 so that the stake 26 is received in the channel 24. It is then a simple matter to pass the free end of each tie 32 through the eye 38 and pull the ends until the stake 26 is firmly secured against the shelter 10. Because the shelter 10 is located against the stake only by the walls 20,22, a wide range of variation in stake dimensions can be tolerated, thus permitting the use of cheap stakes.

While the shelters 10,32,34,36 remain very strong over the early years of their life, they are manufactured from a UV-initiated degradable polypropylene so that they disintegrate after about 5 to 7 years, thus dispensing with the need to remove them. The remains of the shelter and the plastics ties (which do not, as can wire ties, become embedded in the tree) are harmless to animals. Moreover, the twin construction creates a "greenhouse" effect which helps to promote fast growth of the tree within the shelter.

Figure 6:
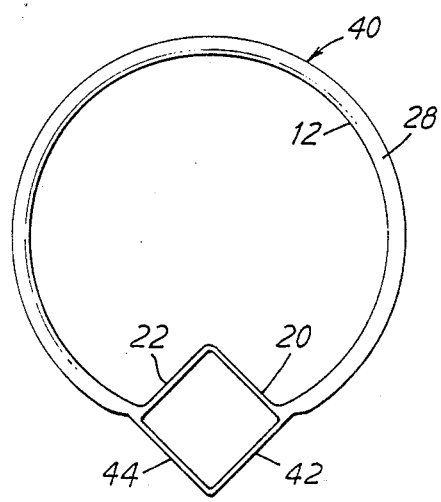
FIG. 6 is a plan of a modification of the shelter of FIGS. 1 to 4.

In FIG. 6 is shown a shelter 40 which generally resembles the shelter 10 except that it is provided with two additional walls 42,44 so as to form a square-section shelter for reception of a stake (not shown). While the shelter 40 requires the use of accurately dimensioned, and therefore more expensive, wooden stakes, no ties are required with a consequent saving in cost and labour.

It will be appreciated that all the above-described shelters are supported by external or sleeved stakes and there is thus no danger of damage to the young tree from preservative fumes.

I claim:

1. A tree shelter comprising an elongate body continuous in a circumferential direction and an integral channel, wherein said body and a wall of said channel form an elongate tubular enclosure for surrounding a tree and said channel is for receiving a stake, wherein said enclosure is open at opposed ends, said enclosure is made of an unperforate plastic material which allows light to pass therethrough, and upper and lower ends of said channel are substantially coterminous with respective opposed ends of said body and said channel is arranged to receive said stake remote from said enclosure for stabilizing said shelter against said stake and for preventing fumes from said stake from entering said enclosure.

2. A shelter as claimed in claim 1, in which said body is formed at one end with an out-turned lip.

3. A shelter as claimed in claim 1 in which said body comprises two spaced walls.

4. A shelter as claimed in claim 1, in which said material is selected from the group consisting of polypropylene, polystyrene or polycarbonate and is degradable by UV light.

5. A shelter according to claim 1 wherein said channel comprises two flat webs forming an angle with each other for receiving a longitudinally-extending corner of a rectangular said stake.

6. A shelter according to claim 5 wherein said channel comprises four flat webs and said channel has a square transverse cross section for receiving said rectangular stake.

7. A set of tree shelters, each member of the set being as claimed in claim 1 and each having a different cross-sectional configuration chosen to allow the members to be nested in transportation or storage.

* * * * *